(12) United States Patent
Paul et al.

(10) Patent No.: US 8,508,791 B1
(45) Date of Patent: Aug. 13, 2013

(54) IMAGE FEEDFORWARD LASER POWER CONTROL FOR A MULTI-MIRROR BASED HIGH POWER IMAGER

(75) Inventors: Peter Paul, Webster, NY (US); Jorge A. Alvarez, Webster, NY (US); Martin Edward Hoover, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 43 days.

(21) Appl. No.: 13/356,213

(22) Filed: Jan. 23, 2012

(51) Int. Cl.
*H04N 1/04* (2006.01)
(52) U.S. Cl.
USPC ............ 358/1.7; 358/475; 358/474; 358/1.15
(58) Field of Classification Search
USPC .................................. 358/1.7, 475, 474, 1.15
See application file for complete search history.

(56) References Cited

U.S. PATENT DOCUMENTS

| | | | |
|---|---|---|---|
| 4,619,198 A | 10/1986 | Moll | |
| 4,690,055 A | 9/1987 | Fadner et al. | |
| 5,130,920 A | 7/1992 | Gebo | |
| 5,207,158 A | 5/1993 | Fadner et al. | |
| 5,218,905 A | 6/1993 | Bolte et al. | |
| 6,477,954 B1 | 11/2002 | Doherty | |
| 6,871,029 B2 | 3/2005 | Brewington et al. | |
| 6,958,183 B2 | 10/2005 | Okamura et al. | |
| 7,066,606 B2 * | 6/2006 | Greve et al. | 353/85 |
| 7,191,705 B2 | 3/2007 | Berg et al. | |
| 7,425,073 B2 | 9/2008 | Wood et al. | |
| 8,028,918 B2 * | 10/2011 | Zhang et al. | 235/462.31 |
| 2005/0028696 A1 | 2/2005 | Price et al. | |
| 2005/0141573 A1* | 6/2005 | Yavid et al. | 372/26 |
| 2006/0169157 A1 | 8/2006 | Gahan | |
| 2008/0078835 A1* | 4/2008 | Gurevich et al. | 235/455 |
| 2011/0024400 A1 | 2/2011 | Rumsby | |
| 2011/0114729 A1 | 5/2011 | Moon et al. | |

* cited by examiner

*Primary Examiner* — Houshang Safaipour
(74) *Attorney, Agent, or Firm* — Ronald E. Prass, Jr.; Prass LLP

(57) ABSTRACT

A power saving apparatus and method for imaging modules in a variable data lithography system is provided. The imaging modules are arranged adjacent to each other to project a scan line of imaging data on a rotating imaging member in a variable data lithography system. The imaging module includes a look ahead buffer which stores imaging data and from which the stored data is read out for projection on the imaging member. The power saving apparatus uses an image look ahead concept to save part of the power consumed in the imaging modules in the projection mode of operation by selectively powering each laser source based on the imaging data in the look ahead buffer.

22 Claims, 10 Drawing Sheets

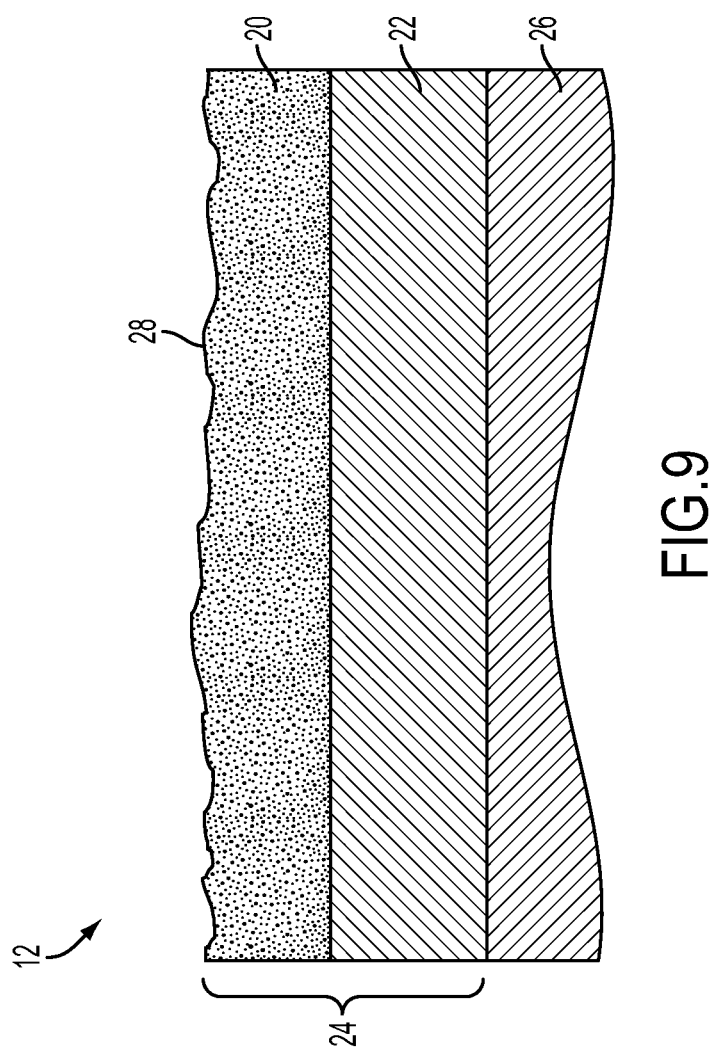

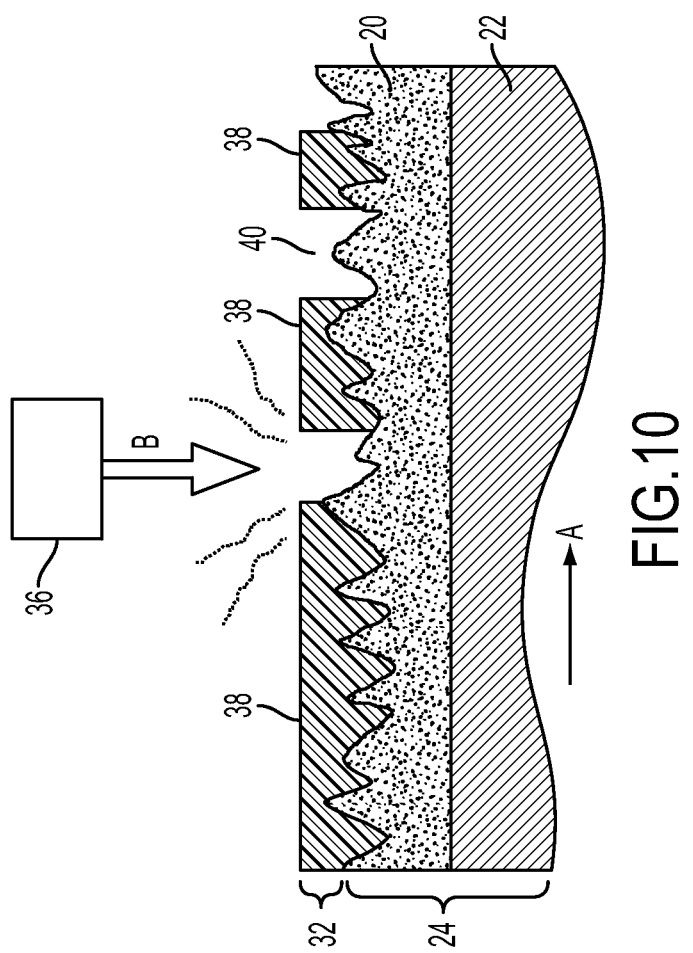

IMAGE FEEDFORWARD LASER POWER CONTROL FOR A MULTI-MIRROR BASED HIGH POWER IMAGER

CROSS REFERENCE TO RELATED PATENTS AND APPLICATIONS

This application is related to the following co-pending applications, which is hereby incorporated by reference in its entirety: "JOINT FEEDFORWARD AND FEEDBACK CONTROL OF A KEYED INK TRAIN FOR UNIFORM INKING IN DIGITAL OFFSET PRINTING SYSTEMS", application Ser. No. 13/356,254, filed herewith, by Peter Paul et al.

This application is related to the following co-pending applications, which is hereby incorporated by reference in its entirety: "IMAGE DATA BASED TEMPERATURE CONTROL OF A KEYLESS INKER FOR DIGITAL OFFSET PRINTING SYSTEMS", application Ser. No. 13/356,308, filed herewith, by Peter Paul et al.

This application is related to the following co-pending applications, which is hereby incorporated by reference in its entirety: "VARIABLE DATA LITHOGRAPHY SYSTEM", application Ser. No. 13/095,714, U.S. Pat. No. 8,347,787 issued on Jan. 8, 2013, filed on 27 Apr. 2011, by Timothy D. Stowe et al.

BACKGROUND

The present disclosure is related to marking and printing methods and systems, and more specifically to a method and apparatus for variably marking or printing data at reduced power consumption.

Offset lithography is a common method of printing today. (For the purpose hereof, the terms "printing" and "marking" are interchangeable.) In a typical lithographic process a printing plate, which may be a flat plate, the surface of a cylinder, belt, etcetera, is formed to have "image regions" formed of hydrophobic and oleophilic material, and "non-image regions" formed of a hydrophilic material. The image regions are regions corresponding to the areas on the final print (i.e., the target substrate) that are occupied by a printing or a marking material such as ink, whereas the non-image regions are the regions corresponding to the areas on the final print that are not occupied by the marking material.

The Variable Data Lithography (also referred to as Digital Lithography or Digital Offset) printing process begins with a fountain solution used to dampen a silicone imaging plate on an imaging drum. The fountain solution forms a film on the silicone plate that is on the order of about one (1) micron thick. The drum rotates to an 'exposure' station where a high power laser imager is used to remove the fountain solution at the locations where the image pixels are to be formed. This forms a fountain solution based 'latent image'. The drum then further rotates to a 'development' station where lithographic-like ink is brought into contact with the fountain solution based 'latent image' and ink 'develops' onto the places where the laser has removed the fountain solution. The ink is hydrophobic. An ultra violet (UV) light may be applied so that photo-initiators in the ink may partially cure the ink to prepare it for high efficiency transfer to a print media such as paper. The drum then rotates to a transfer station where the ink is transferred to a printing media such as paper. The silicone plate is compliant, so an offset blanket is not used to aid transfer. UV light may be applied to the paper with ink to fully cure the ink on the paper. The ink is on the order of one (1) micron pile height on the paper.

The formation of the image on the printing plate is done with imaging modules each using a linear output high power infrared (IR) laser to illuminate a digital light projector (DLP) multi-mirror array, also referred to as the "DMD" (Digital Micromirror Device). The mirror array is similar to what is commonly used in computer projectors and some televisions. The laser provides constant illumination to the mirror array. The mirror array deflects individual mirrors to form the pixels on the image plane to pixel-wise evaporate the fountain solution on the silicone plate. If a pixel is not to be turned on, the mirrors for that pixel deflect such that the laser illumination for that pixel does not hit the silicone surface, but goes into a chilled light dump heat sink. A single laser and mirror array form an imaging module that provides imaging capability for approximately one (1) inch in the cross-process direction. Thus a single imaging module simultaneously images a one (1) inch by one (1) pixel line of the image for a given scan line. At the next scan line, the imaging module images the next one (1) inch by one (1) pixel line segment. By using several imaging modules, comprising several lasers and several mirror-arrays, butted together, imaging function for a very wide cross-process width is achieved.

Due to the need to evaporate the fountain solution, in the imaging module, power consumption of the laser accounts for the majority of total power consumption of the whole system. It is therefore vital to scheme how much electric power of the laser and the electronics is saved in terms of realizing power saving of the whole system. Such being the case, a variety of power saving technologies for the imaging modules have been proposed. For example, the schemes to reduce the size of the image formed on the printing plate, changing the depth of the pixel, and substituting less powerful image creating source such as a conventional Raster Output Scanner (ROS). To evaporate a one (1) micron thick film of water, at process speed requirements of up to five meters per second (5 m/s), requires on the order of 100,000 times more power than a conventional xerographic ROS imager. In addition, cross-process width requirements are on the order of 36 inches, which makes the use of a scanning beam imager problematic. Thus a special imager design is required.

An over looked area of power conservation is the operation of the lasers in the digital lithographic printing process. The lasers are not modulated to create each pixel as in a ROS, but continuously illuminate the mirror arrays. The laser is always "ON" whether or not a pixel is being created on the plate. The mirrors deflect the light energy for each pixel either to the imaging plate or to the dump. The mirror arrays are able to simultaneously image on the order of 1024 pixels in the cross-process direction. Typical document area coverage levels are 5% for black and 3% each for cyan, magenta, and yellow. Thus most of the laser power in this imager is deflected into the dump, rather than onto the imaging plate to form the image. For example, the power consumption to create a six color image of thirty six inch (36) width with an imaging module per linear inch (36 imagers) requires on the order of 7.5 kW of power. Further, when the above coverage areas are factored in there is on the order of 6.5 kW of that power is ending in the beam dump of the DLP mirror.

SUMMARY

A power saving apparatus and method for imaging modules in a variable data lithography system is provided. The imaging modules are arranged adjacent to each other to project a scan line of imaging data on a rotating imaging member in a variable data lithography system. The imaging module includes a look ahead buffer which stores imaging data and from which the stored data is read out for projection on the imaging member. The power saving apparatus uses an image look ahead concept to save part of the power consumed in the imaging modules in the projection mode of operation by selectively powering each laser source based on the imaging data in the look ahead buffer.

BRIEF DESCRIPTION OF THE DRAWINGS

FIG. 9 is a cut-away side view of a reimaging portion of an imaging drum, plate or belt in accordance to an embodiment; and FIG. 10 is a magnified cut-away side view of the reimaging portion shown in FIG. 8, having a dampening solution applied thereover and patterned by a beam B in accordance to an embodiment.

DETAILED DESCRIPTION

Figure 1:
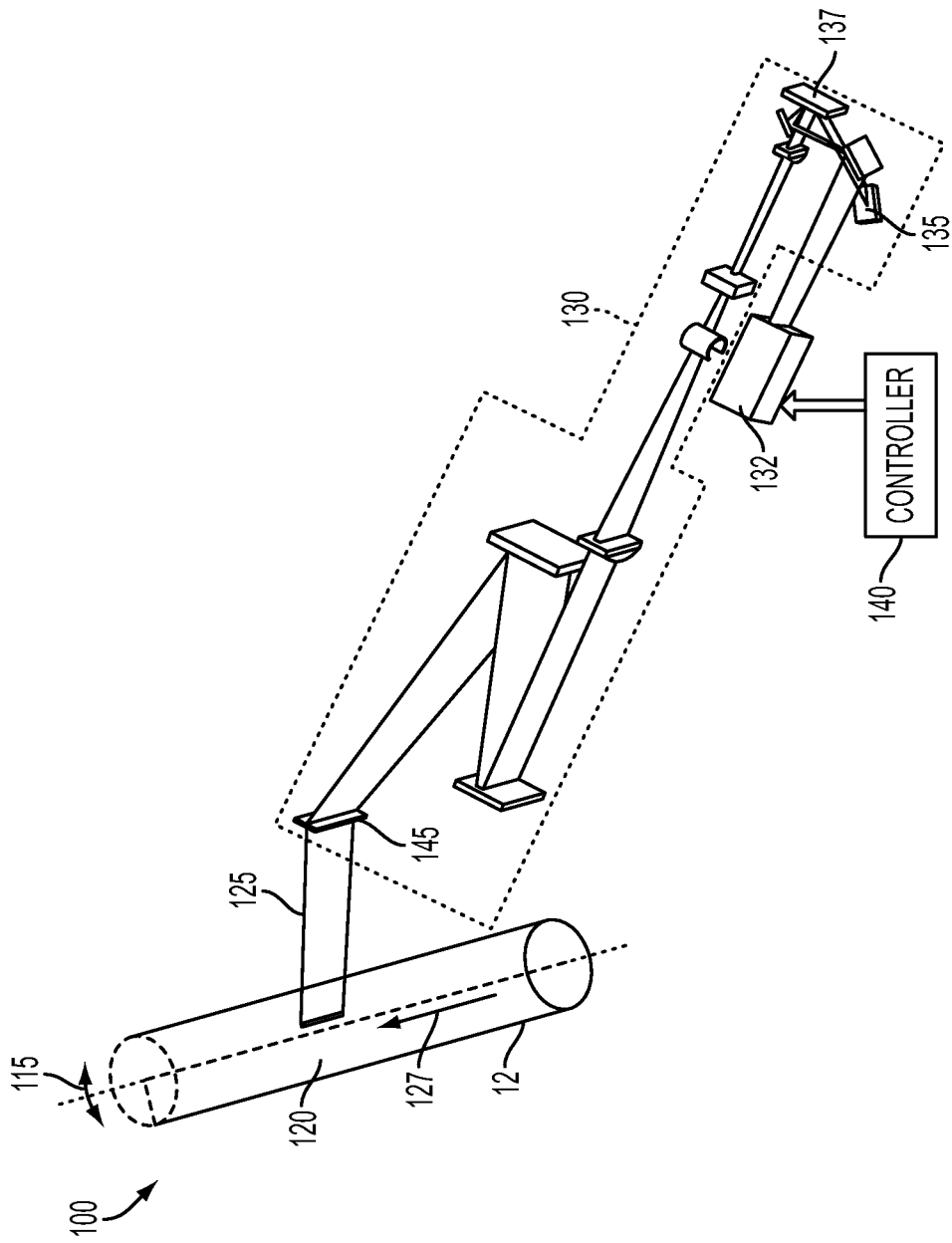
FIG. 1 is an illustration of one out of M imager modules arranged to project a scan line of imaging data on a rotating imaging member in a variable data lithography system in accordance to an embodiment.

The disclosed embodiment pertains to a "green" energy saving method for Variable Data Lithography that operates by intelligently turning off lasers. The method operates by using an image buffer for a look-ahead determination of potential laser usage for a given laser. Specifically, the disclosed embodiment proposes that each imaging module have a look-ahead buffer to determine if in the one inch by N pixel (1×N) sub-image any pixels are ON. If any pixels are ON, the laser must remain ON, if all the pixels are OFF, the laser is turned OFF. For the next scan line, the buffer is indexed forward and new scan line data is entered into the last line in the buffer. The new scan line is examined to determine if any pixels are ON, if any are ON, the laser is turned ON, if not, the laser remains OFF. The buffer is large enough so that by the time new scan line data with ON pixels reaches the top of the buffer, the laser is fully ON and any settling time requirements have been met. The buffer could be contone or binary.

Aspects of the disclosed embodiments relate to a variable data lithography system to project an image on a reimageable surface layer on a rotating imaging member, the system having at least one imaging module each placed at individual zones adjacent to each other across from the imaging member to form a scanline of the image, each imaging module comprising an energizable laser source for generating a laser beam when energized; a look ahead buffer for storing scanline data of the image to be projected on the imaging member, wherein the look ahead buffer has top scanline data and bottom scanline data; an optical assembly positioned to sweep the laser beam at the individual zones to project the top scanline data in the look ahead buffer on the imaging member; and a logic circuit to selectively power the energizable laser source based on the sub-image in the look ahead buffer by: determining if the scanline data in the look ahead buffer has pixels to be illuminated by the laser beam; if the scanline data in the look ahead buffer has pixels to be illuminated then energizing the laser source so that the optical assembly can project the top scanline data on the imaging member; else deenergizing the laser source by interrupting electrical power to the laser source.

In yet further aspects of the disclosed embodiments relate to a variable data lithography system where the logic circuit further performing removing the top scanline data in the look ahead buffer.

In yet further aspects of the disclosed embodiments relate to a variable data lithography system where the logic circuit further performs moving remaining scan line data up one scanline in the look ahead buffer.

In yet further aspects of the disclosed embodiments relate to a variable data lithography system where the logic circuit further performs appending additional scanline data of the image to the look ahead buffer; repeating the steps of determining, deciding, removing, moving, and appending until the look ahead buffer is empty.

In yet further aspects of the disclosed embodiments relate to a variable data lithography system wherein the optical assembly is a digital light projector multi-mirror array.

In yet further aspects of the disclosed embodiments relate to a variable data lithography system where wherein the reimageable surface layer on the rotating imaging member comprises silicone.

In yet further aspects of the disclosed embodiments relate to a variable data lithography system where wherein the size of the look-ahead buffer is based on the rotational speed of the imaging member, laser source settling time, and a quality safety factor.

Further aspects of the disclosed embodiments include a power conservation method for at least one imaging module in a variable data lithography system with a reimageable surface layer on a rotating imaging member, each imaging module placed at individual zones adjacent to each other across from the imaging member to form a scanline of an image, the method comprising generating a laser beam from an energizable laser source when energized; storing in a look ahead buffer scanline data of the image to be projected on the imaging member, wherein the look ahead buffer has top scanline data and bottom scanline data; sweeping with an optical assembly the laser beam at the individual zones to project the top scanline data in the look ahead buffer on the imaging member; and selectively powering the energizable laser source based on the scanline of image data in the look ahead buffer by a logic unit performing the steps of: determining if the scanline data in the look ahead buffer has pixels to be illuminated by the laser beam; if the scanline data in the look ahead buffer has pixels to be illuminated then energizing the laser source so that the optical assembly can project the top scanline data on the imaging member; else deenergizing the laser source by interrupting electrical power to the laser source.

In yet further aspects of the disclosed embodiments relate to an apparatus to operate at least one imaging module in a power conservation mode, the at least one imaging module ablating the surface of a rotating and substantially cylindrical drum in a variable data lithography system, each imaging module placed at individual zones adjacent to each other across from the substantially cylindrical drum to form a scanline of an image, the apparatus comprising at least one energizable laser source for generating a laser beam when energized; at least one look ahead buffer for storing scanlines of image data of an image to be ablated on the surface of the drum; an optical projection system positioned to sweep the laser beam for projecting a scanline of image data onto a target area of the drum surface; a control system for controlling the laser beam in relation to the angular position of the drum such that laser beam occur whenever the target area on the drum surface has moved a distance in the direction of rotation by performing the steps of: determining if a scanline of the scanline of image data in the at least one look ahead buffer to be projected on the drum surface has pixels to be ablated by the laser beam; if the scanline of the scanline of image data has pixels to be ablated on the target area of the drum surface then energizing the laser source by supplying electrical power to the at least one laser source to generate the laser beam; else deenergizing the laser source by interrupting the electrical power to the at least one laser source.

Embodiments as disclosed herein may also include computer-readable media for carrying or having computer-executable instructions or data structures stored thereon for operating such devices as controllers, sensors, and eletromechanical devices. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

The term "print media" generally refers to a usually flexible, sometimes curled, physical sheet of paper, cloth, cardboard, plastic or composite sheet film, ceramic, glass, wood, sheet metal or other suitable physical print media substrate for images.

The term "variable data printing" or "digital printing" generally refers to a system that can print or mark variable data documents, that is, documents that vary in image content from page-to-page.

As used herein relational terms such as "first," "second," and the like may be used solely to distinguish one entity or action from another entity or action without necessarily requiring or implying any actual such relationship or order between such entities or actions. Also, relational terms, such as "offset", "upstream", "downstream", "top," "bottom," "front," "back," "horizontal," "vertical," and the like may be used solely to distinguish a spatial orientation of elements relative to each other and without necessarily implying a spatial orientation relative to any other physical coordinate system. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

FIGS. 7-10 shows the hardware and operating environment of variable data lithography in which different embodiments can be practiced.

Figure 7:
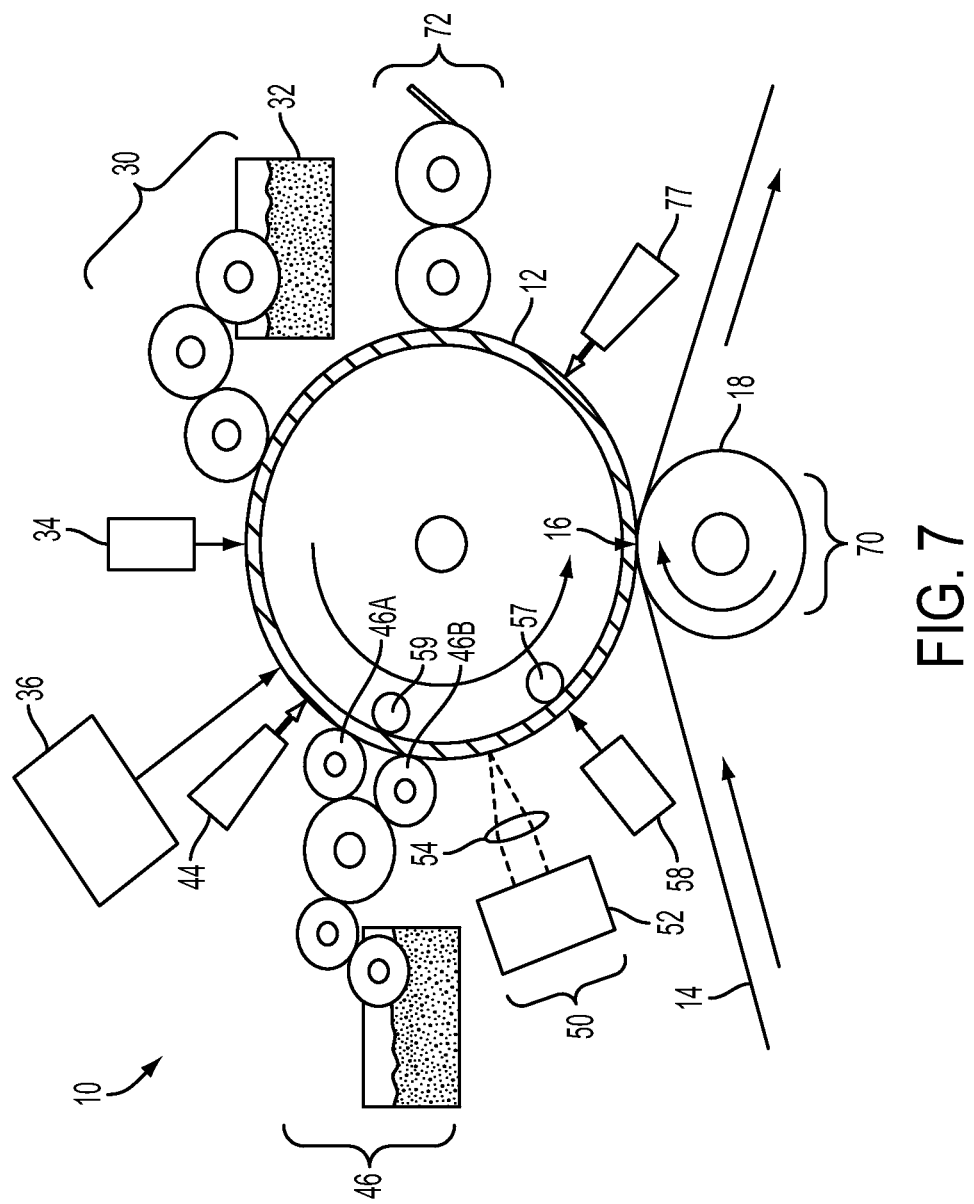
FIG. 7 is a side view of a system for variable lithography in accordance to an embodiment.

FIG. 7 illustrates therein a system 10 for variable lithography according to one embodiment of the present disclosure. System 10 comprises an imaging member 12, in this embodiment a drum, but may equivalently be a plate, belt, and the like, surrounded by a number of subsystems described in detail below. Imaging member 12 applies an ink image to substrate 14 at nip 16 where substrate 14 is pinched between imaging member 12 and an impression roller 18. A wide variety of types of substrates, such as paper, plastic or composite sheet film, ceramic, glass, and the like may be employed. For clarity and brevity of this explanation we assume the substrate is paper, with the understanding that the present disclosure is not limited to that form of substrate. For example, other substrates may include cardboard, corrugated packaging materials, wood, ceramic tiles, fabrics (e.g., clothing, drapery, garments and the like), transparency or plastic film, metal foils, and the like. A wide latitude of marking materials may be used including those with pigment densities greater than ten percent (10%) by weight including but not limited to metallic inks or white inks useful for packaging. For clarity and brevity of this portion of the disclosure we generally use the term ink, which will be understood to include the range of marking materials such as inks, pigments, and other materials which may be applied by systems and methods disclosed herein.

The inked image from imaging member 12 may be applied to a wide variety of substrate formats, from small to large, without departing from the present disclosure. In one embodiment, imaging member 12 is at least 38 inches (38") wide so that standard 4 sheet signature page or larger media format may be accommodated. The diameter of imaging member 12 must be large enough to accommodate various subsystems around its peripheral surface. In one embodiment, imaging member 12 has a diameter of 10 inches, although larger or smaller diameters may be appropriate depending upon the application of the present disclosure.

As shown in FIG. 7 at a first location around imaging member 12 is a dampening solution subsystem 30. Dampening solution subsystem 30 generally comprises a series of rollers (referred to as a dampening unit) for uniformly wetting the surface of reimageable surface layer 20. It is well known that many different types and configurations of dampening units exist. The purpose of the dampening unit is to deliver a layer of dampening solution 32 having a uniform and controllable thickness. In one embodiment this layer is in the range of 0.2 µm to 1.0 µm, and very uniform without pinholes. The dampening solution 32 may be composed mainly of water, optionally with small amounts of isopropyl alcohol or ethanol added to reduce its natural surface tension as well as lower the evaporation energy necessary for subsequent laser patterning. In addition, a suitable surfactant is ideally added in a small percentage by weight, which promotes a high amount of wetting to the reimageable surface layer 20. In one embodiment, this surfactant consists of silicone glycol copolymer families such as trisiloxane copolyol or dimethiconecopolyol compounds which readily promote even spreading and surface tensions below 22 dynes/cm at a small percentage addition by weight. Other fluorosurfactants are also possible surface tension reducers. Optionally dampening solution 32 may contain a radiation sensitive dye to partially absorb laser energy in the process of patterning, described further below. In addition to or in substitution for chemical methods, physical/electrical methods may be used to facilitate the wetting of dampening solution 32 over the reimageable surface layer 20. In one example, electrostatic assist operates by way of the application of a high electric field between the dampening roller and reimageable surface layer 20 to attract a uniform film of dampening solution 32 onto reimageable surface layer 20. The field can be created by applying a voltage between the dampening roller and the reimageable surface layer 20 or by depositing a transient but sufficiently persisting charge on the reimageable surface layer 20 itself. The dampening solution 32 may be electronically conductive. Therefore, in this embodiment an insulating layer (not shown) may be added to the dampening roller and/or under reimageable surface layer 20. Using electrostatic assist, it may be possible to reduce or eliminate the surfactant from the dampening solution.

Figure 2:
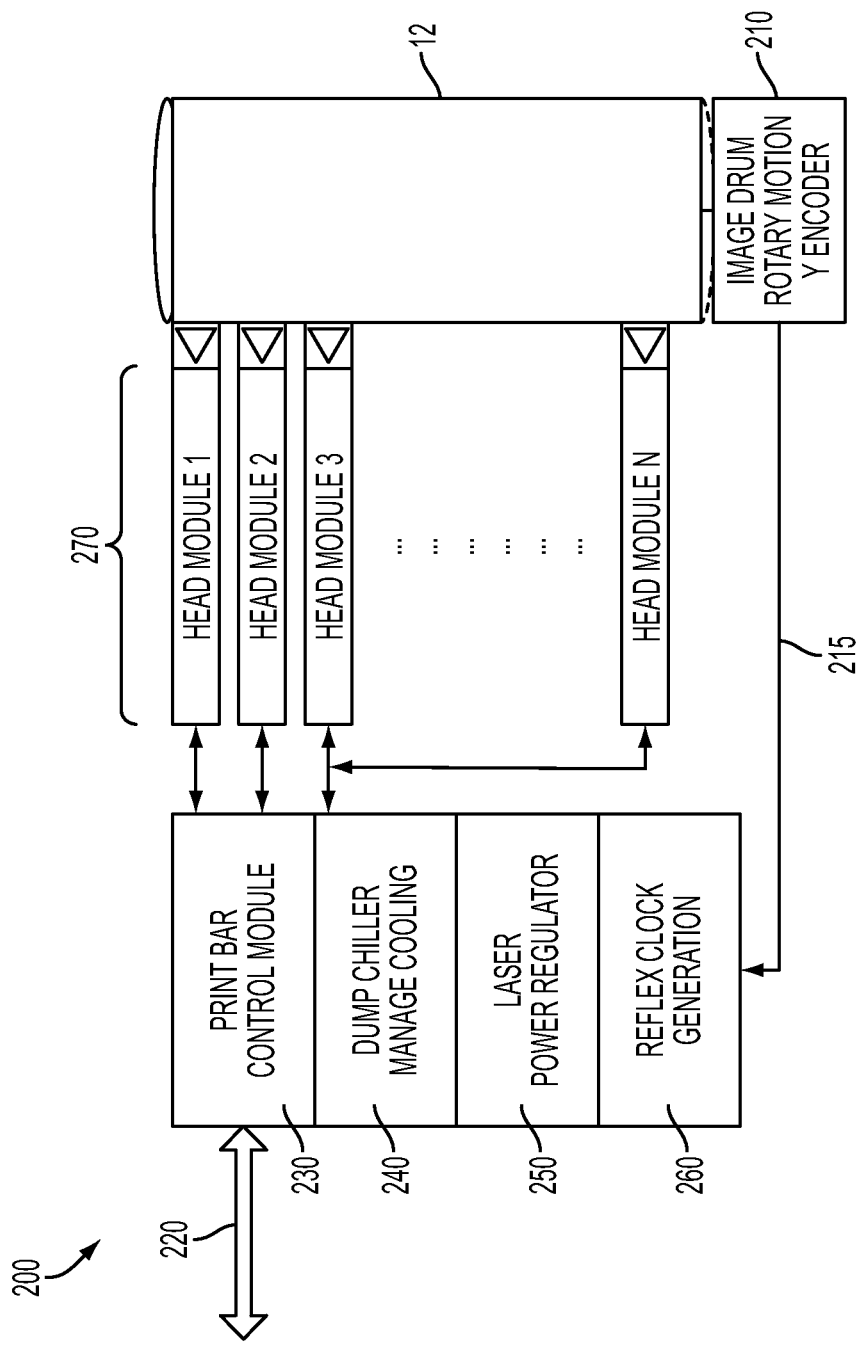
FIG. 2 is a block diagram of an overview of an optical patterning subsystem to form an image on a rotating imaging member in a variable data lithography system in accordance to an embodiment.

After applying a precise and uniform amount of dampening solution, in one embodiment an optical patterning subsystem 36, see FIG. 2, is used to selectively form a latent image in the dampening solution by image-wise evaporating the dampening solution layer using laser energy, for example. It should be noted here that the reimageable surface layer 20 should ideally absorb most of the energy as close to an upper surface 28 (FIG. 8) as possible, to minimize any energy wasted in heating the dampening solution and to minimize lateral spreading of the heat so as to maintain high spatial resolution capability. Alternatively, it may also be preferable to absorb most of the incident radiant (e.g., laser) energy within the dampening solution layer itself, for example, by including an appropriate radiation sensitive component within the dampening solution that is at least partially absorptive in the wavelengths of incident radiation, or alternatively by choosing a radiation source of the appropriate wavelength that is readily absorbed by the dampening solution (e.g., water has a peak absorption band near 2.94 micrometer wavelength). It will be understood that a variety of different systems and methods for delivering energy to pattern the dampening solution over the reimageable surface may be employed with the various system components disclosed and claimed herein. However, the particular patterning system and method do not limit the present disclosure.

Returning to FIG. 7, following patterning of the dampening solution layer 32, an inker subsystem 46 is used to apply a uniform layer 48 of ink over the layer of dampening solution 32 and reimageable surface layer 20. In addition, an air knife 44 may be optionally directed towards reimageable surface layer 20 to control airflow over the surface layer before the inking subsystem 46 for the purpose of maintaining clean dry air supply, a controlled air temperature and reducing dust contamination. Inker subsystem 46 may consist of a "keyless" system using an anilox roller to meter an offset ink onto one or more forming rollers 46a, 46b. Alternatively, inker subsystem 46 may consist of more traditional elements with a series of metering rollers that use electromechanical keys to determine the precise feed rate of the ink. The general aspects of inker subsystem 46 will depend on the application of the present disclosure, and will be well understood by one skilled in the art.

In order for ink from inker subsystem 46 to initially wet over the reimageable surface layer 20, the ink must have low enough cohesive energy to split onto the exposed portions of the reimageable surface layer 20 (ink receiving dampening solution voids 40) and also be hydrophobic enough to be rejected at dampening solution regions 38. Since the dampening solution is low viscosity and oleophobic, areas covered by dampening solution naturally reject all ink because splitting naturally occurs in the dampening solution layer which has very low dynamic cohesive energy. In areas without dampening solution, if the cohesive forces between the ink are sufficiently lower than the adhesive forces between the ink and the reimageable surface layer 20, the ink will split between these regions at the exit of the forming roller nip. The ink employed should therefore have a relatively low viscosity in order to promote better filling of voids 40 and better adhesion to reimageable surface layer 20. For example, if an otherwise known UV ink is employed, and the reimageable surface layer 20 is comprised of silicone, the viscosity and viscoelasticity of the ink will likely need to be modified slightly to lower its cohesion and thereby be able to wet the silicone. Adding a small percentage of low molecular weight monomer or using a lower viscosity oligomer in the ink formulation can accomplish this rheology modification. In addition, wetting and leveling agents may be added to the ink in order to further lower its surface tension in order to better wet the silicone surface.

In addition to this rheological consideration, it is also important that the ink composition maintain a hydrophobic character so that it is rejected by dampening solution regions 38. This can be maintained by choosing offset ink resins and solvents that are hydrophobic and have non-polar chemical groups (molecules). When dampening solution covers layer 20, the ink will then not be able to diffuse or emulsify into the dampening solution quickly and because the dampening solution is much lower viscosity than the ink, film splitting occurs entirely within the dampening solution layer, thereby rejecting ink any ink from adhering to areas on layer 20 covered with an adequate amount of dampening solution. In general, the dampening solution thickness covering layer 20 may be between 0.1 µm-4.0 µm, and in one embodiment 0.2 µm-2.0 µm depending upon the exact nature of the surface texture. The thickness of the ink coated on roller 46a and optional roller 46b can be controlled by adjusting the feed rate of the ink through the roller system using distribution rollers, adjusting the pressure between feed rollers and the final form rollers 46a, 46b (optional), and by using ink keys to adjust the flow off of an ink tray (show as part of 46). Ideally, the thickness of the ink presented to the form rollers 46a, 46b should be at least twice the final thickness desired to transfer to the reimageable layer 20 as film splitting occurs. It is also possible to use a keyless system which can control the overall ink film thickness by using an anilox roller with uniformly formed ink carrying pits and maintaining the temperature to achieve the desired ink viscosity. Typically, the final film thickness may be approximately 1-2 mm. Ideally, an optimized ink system 46 splits onto the reimageable surface at a ratio of approximately 50:50 (i.e., 50% remains on the ink forming rollers and 50% is transferred to the reimageable surface at each pass). However, other splitting ratios may be acceptable as long as the splitting ratio is well controlled. For example, for 70:30 splitting, the ink layer over reimageable surface layer 20 is 30% of its nominal thickness when it is present on the outer surface of the forming rollers. It is well known that reducing an ink layer thickness reduces its ability to further split. This reduction in thickness helps the ink to come off from the reimageable surface very cleanly with residual background ink left behind. However, the cohesive strength or internal tack of the ink also plays an important role.

There are two competing results desired at this point. First, the ink must flow easily into voids 40 so as to be placed properly for subsequent image formation. Furthermore, the ink should flow easily over and off of dampening solution regions 38. However, it is desirable that the ink stick together in the process of separating from dampening solution regions 38, and ultimately it is also desirable that the ink adhere to the substrate and to itself as it is transferred out of voids 40 (FIG. 10) onto the substrate both to fully transfer the ink (fully emptying voids 40) and to limit bleeding of ink at the substrate. The ink is next transferred to substrate 14 at transfer subsystem 70. In the embodiment illustrated in FIG. 1, this is accomplished by passing substrate 14 through nip 16 between imaging member 12 and impression roller 18. Adequate pressure is applied between imaging member 12 and impression roller 18 such that the ink within voids 40 (FIG. 10) is brought into physical contact with substrate 14. Adhesion of the ink to substrate 14 and strong internal cohesion cause the ink to separate from reimageable surface layer 20 and adhere to substrate 14. Impression roller or other elements of nip 16 may be cooled to further enhance the transfer of the inked latent image to substrate 14. Indeed, substrate 14 itself may be maintained at a relatively colder temperature than the ink on imaging member 12, or locally cooled, to assist in the ink transfer process. The ink can be transferred off of reimageable surface layer 20 with greater than 95% efficiency as measured by mass, and can exceed 99% efficiency with system optimization.

Figure 8:
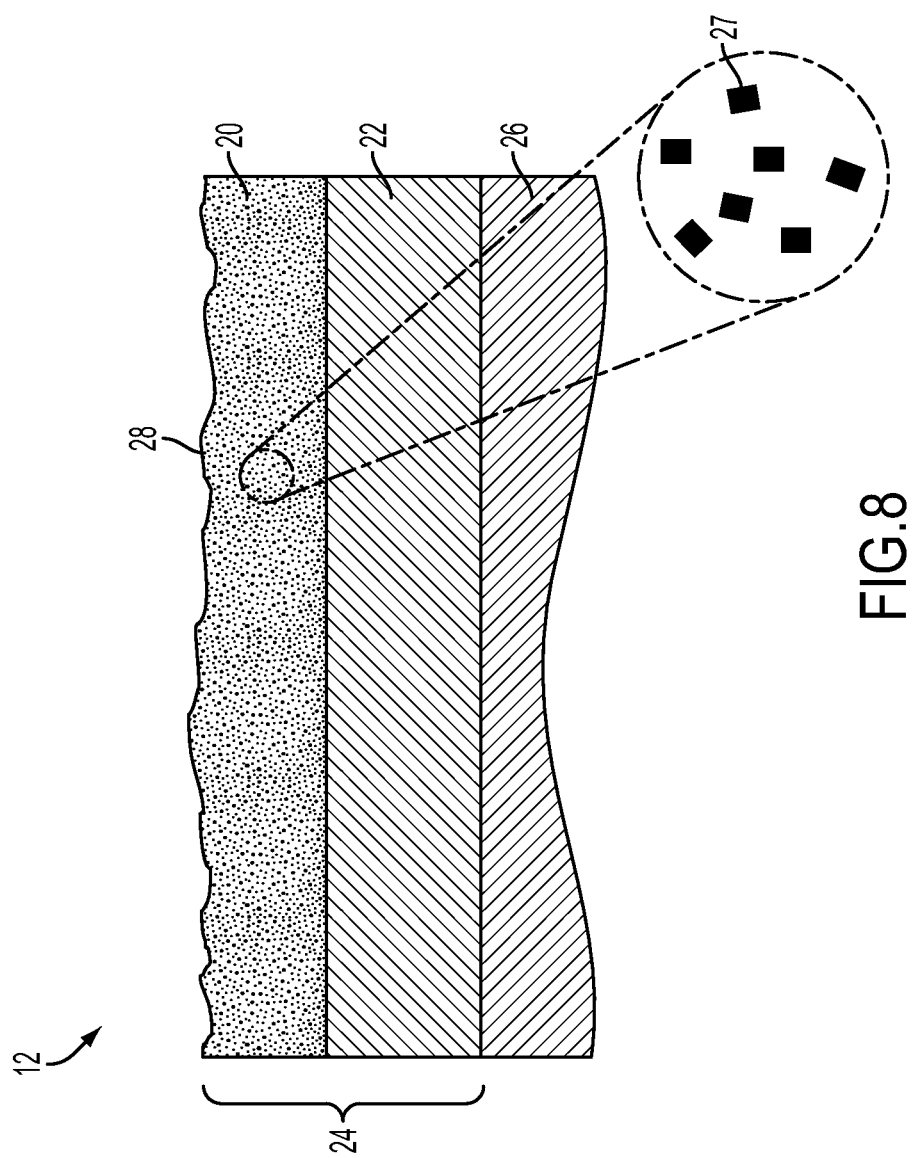
FIG. 8 is a cut-away side view of a reimaging portion of an imaging drum, plate or belt, without and with an intermediate layer, respectively in accordance to an embodiment.

With reference to FIG. 8, a portion of imaging member 12 is shown in cross-section. In one embodiment, imaging member 12 comprises a thin reimageable surface layer 20 formed over a structural mounting layer 22 (for example metal, ceramic, plastic, etc.), which together forms a reimaging portion 24 that forms a rewriteable printing blanket. Reimaging portion 24 may further comprise additional structural layers, such as intermediate layer (Not Shown) below reimageable surface layer 20 and either above or below structural mounting layer 22. Intermediate layer may be electrically insulating (or conducting), thermally insulating (or conducting), have variable compressibility and durometer, and so forth. In one embodiment, intermediate layer is composed of closed cell polymer foamed sheets and woven mesh layers (for example, cotton) laminated together with very thin layers of adhesive. Typically, blankets are optimized in terms of compressibility and durometer using a 3-4 ply layer system that is between 1-3 mm thick with a thin top surface layer 20 designed to have optimized roughness and surface energy properties. Reimaging portion 24 may take the form of a stand-alone drum or web, or a flat blanket wrapped around a cylinder core 26. In another embodiment the reimageable portion 24 is a continuous elastic sleeve placed over cylinder core 26. Flat plate, belt, and web arrangements (which may or may not be supported by an underlying drum configuration) are also within the scope of the present disclosure. For the purposes of the following discussion, it will be assumed that reimageable portion 24 is carried by cylinder core 26, although it will be understood that many different arrangements, as discussed above, are contemplated by the present disclosure.

Reimageable surface layer 20 consists of a polymer such as polydimethylsiloxane (PDMS, or more commonly called silicone) for example with a wear resistant filler material such as silica to help strengthen the silicone and optimize its durometer, and may contain catalyst particles that help to cure and cross link the silicone material. Alternatively, silicone moisture cure (aka tin cure) silicone as opposed to catalyst cure (aka platinum cure) silicone may be used. Reimageable surface layer 20 may optionally contain a small percentage of radiation sensitive particulate material 27 dispersed therein that can absorb laser energy highly efficiently. In one embodiment, radiation sensitivity may be obtained by mixing a small percentage of carbon black, for example in the form of microscopic (e.g., of average particle size less than 10 µm or nanoscopic particles (e.g., of average particle size less than 1000 nm) or nanotubes, into the polymer. Other radiation sensitive materials that can be disposed in the silicone include graphene, iron oxide nano particles, nickel plated nano particles, and the like.

Alternatively, reimageable surface layer 20 may be tinted or otherwise treated to be uniformly radiation sensitive, as shown in FIG. 9. Still further, reimageable surface layer 20 may be essentially transparent to optical energy from a source, described further below, and the structural mounting layer or layers 22 may be absorptive of that optical energy (e.g., layer 22 comprises a component that is at least partially absorptive), as illustrated in FIG. 10.

With reference to FIG. 10, which is a magnified view of a region of reimageable portion 24 having a layer of dampening solution 32 applied over reimageable surface layer 20, the application of optical patterning energy (e.g., beam B) from optical patterning subsystem 36 results in selective evaporation of portions the layer of dampening solution 32. Evaporated dampening solution becomes part of the ambient atmosphere surrounding system 10. This produces a pattern of dampening solution regions 38 and ink receiving voids 40 over reimageable surface layer 20. Relative motion between imaging member 12 or moving surface and optical patterning subsystem 36, for example in the direction of arrow A, permits a process-direction patterning of the layer of dampening solution 32.

FIG. 1 is an illustration of one out of M imager modules 100 arranged to project a segment of a scan line of imaging data on a rotating imaging member in a variable data lithography system in accordance to an embodiment.

The imager module uses digital light projector (DLP) 137 that has an array of mirrors that deflect in response to a command from an internal controller (not shown). A projection lens 145 projects the scan line of imaging data on the surface of rotating imaging member 12 Before projecting an image on the imaging member 12, the surface of the member is prepared with a reimageable surface 20 layer created from a fountain solution which forms into a film on the silicone plate of the imaging member 12 that is on the order of one micron (1 µm) thick.

A single laser 132 and optical assembly 130 form an imaging module that provides imaging capability for approximately one inch (1") in the cross-process direction 127. It uses a linear output high power infrared (IR) laser 132 to illuminate a DLP multi-mirror array, also referred to as the "DMD" (Digital Micromirror Device). The mirror array is similar to what is commonly used in computer projectors and some televisions. The laser 132 provides constant illumination to the mirror array. The mirror array deflects individual mirrors to form the pixels on the reimageable surface 20. The directing of the DLP modulated laser beam 125 evaporates the fountain solution on the silicone plate in a pixel-wise fashion. Thus a single imaging module simultaneously images a one inch (1") by one (1) pixel line of the image for a given scan line. At the next scan line caused by the rotation 115 of the imaging member 12, the imaging module images the next one inch (1") by one (1) pixel line segment. If a pixel is not to be turned on, the mirrors for that pixel deflect such that the laser illumination for that pixel does not hit the silicone surface, but goes into a chilled light dump heat sink 135. By using several imaging modules, comprising several lasers and several mirror-arrays, each placed at individual zones adjacent to each other across from the imaging member to form a complete scanline of the image a very wide cross-process width is achieved. Of course, the imaging modules need to be calibrated to each other to remove image alignment and uniformity defects between modules, very similar to modular printheads in ink jet printing. To improve the power consumption response of the imaging modules a controller 140 is provided for selectively powering the laser 132 based on the content in a look-ahead buffer (not shown).

The DLP or digital micromirror device (DMD) includes a semiconductor chip, in which several to hundreds of thousands to millions of driving micromirrors (cells) are integrated in a flat plate form. That is, the size of one cell is very small, which is determined by a micro unit. Typically, the digital micromirror device xxx is operated in such a manner that it enlarges and projects light using an image signal inputted from a computer or other appliance. In addition, because such a micromirror device includes hundreds of thousands or millions of micromirrors for switching the paths of reflected beams no more than several times per sec to hundreds of thousands of times per sec, each of the micromirrors can control collected beams in a digital method. Typically, each of the micromirrors in the digital micromirror device is turned from one mechanical state or to another mechanical state by electric voltage, thereby being positioned in a desired orientation.

FIG. 2 is a block diagram of an overview of an optical patterning subsystem 200 to form an image on a rotating imaging member 12 in a variable data lithography system in accordance to an embodiment. A signal 220 is received at the print bar control module 230 such as a dynamic FPGA which allows a designer to make changes on the fly such as increasing the size of the look ahead buffer. The received signal 220 eventually results in a laser beam that is reflected by mirrors in the respective head module 270, the reflected beam is directed to imaging member 12 where a linear image is formed. The movement of the imaging member is measured by an encoder 210 which serves as basis for indexing the buffer forward (next line) and new scan line can be projected on the imaging member 12. A reflex clock generator 260 uses the encoder signal 210 to fire up the lasers to produce the desired dots per inch (dpi) The dump chiller manage cooling 240 performs active thermal management components to control the temperature increases produced from the dumping of the "OFF" pixels. The cooling is done by a circulating cooling fluid/radiator system to radiate heat from the heat spreading assembly to the outside. A laser power regulator 250 adjusts laser power so that individual lasers within the head modules 270 can be altered and controlled by the print bar control module 230. The control module may increase or decrease laser power resulting in normalizing head modules 270 to each other.

Figure 3:
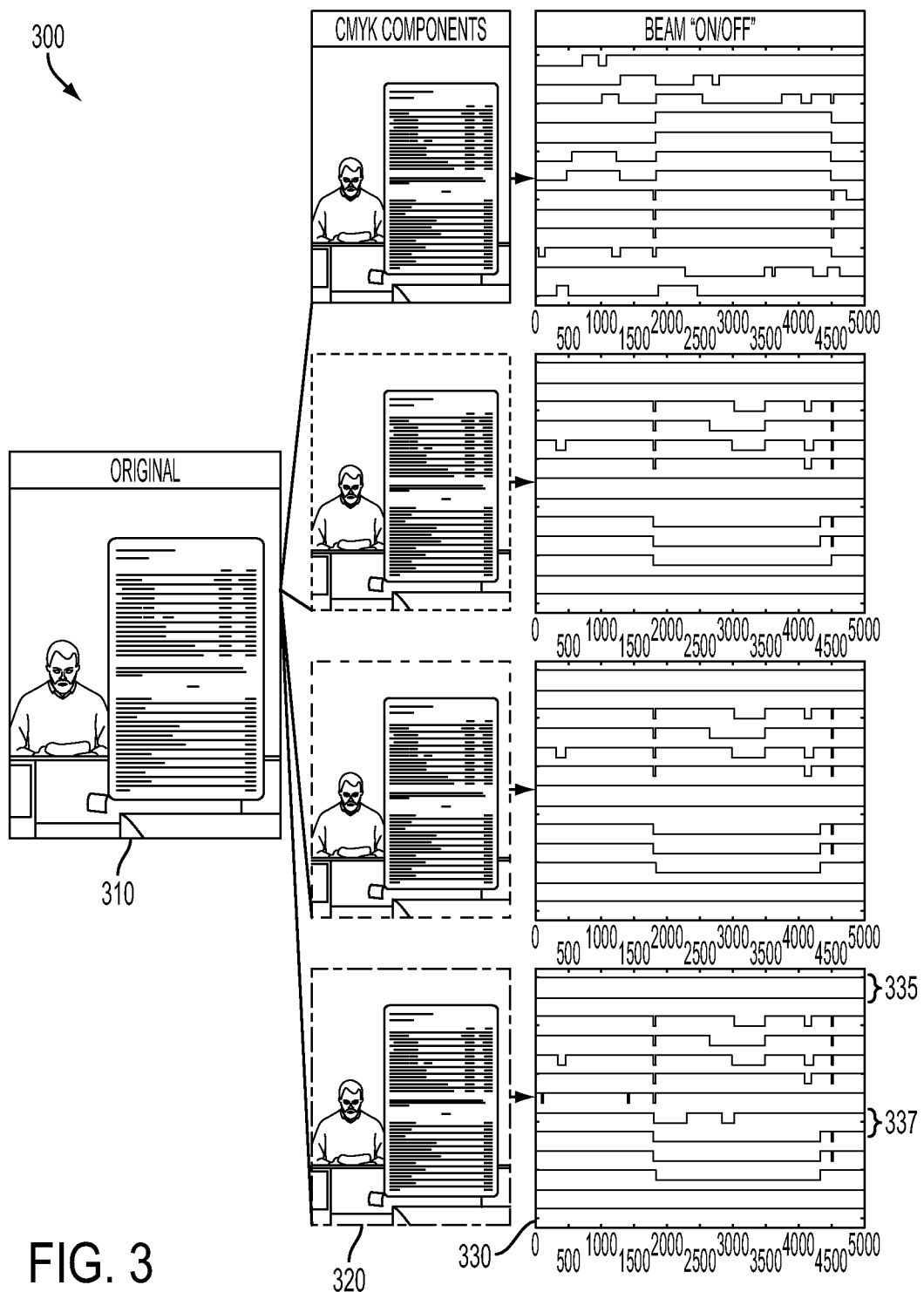
FIG. 3 is an illustration of the image look ahead concept on a text and graphic document in accordance to an embodiment.

FIG. 3 is an illustration of the image look ahead concept on a text and graphic document in accordance to an embodiment. A possible print job 300 consisting of one or more images is received at the variable data lithography system. An original image 310 consisting of graphics and text is shown. The four process components 320 (Cyan, Magenta, Yellow and Black (CMYK)) of the image is shown with a signal representation 330 of laser usage. As can be seen from signal 337 there are occasions where lasering can be selectively turned "ON" or "OFF". For example, signal 337 shows that in the middle portion of the cycle there are opportunities for power conservation. These power conservation opportunities can be realized based on the look ahead concept discussed with reference to method 600 shown in FIG. 6.

Figure 4:
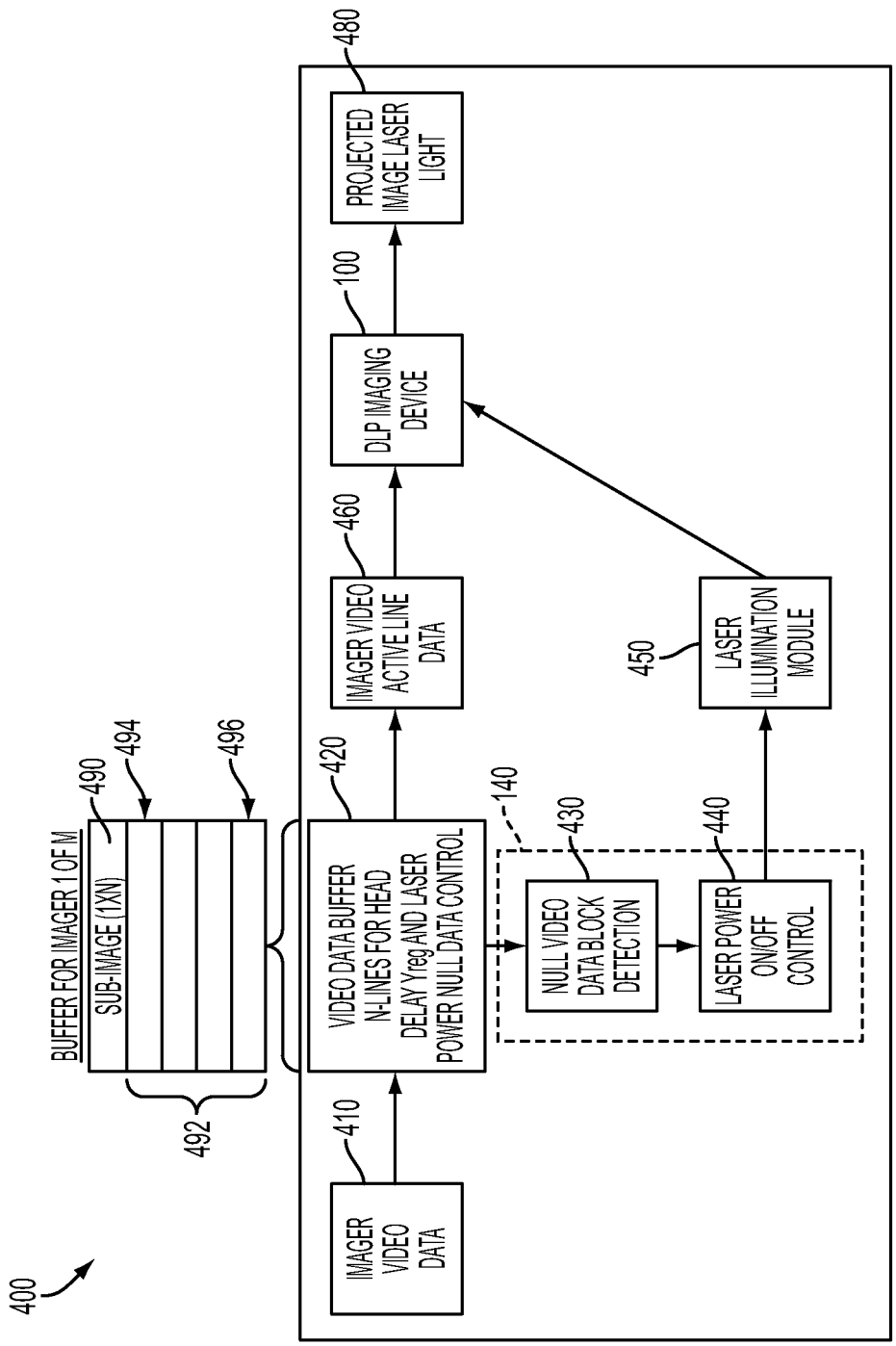
FIG. 4 is an illustration of the image path architecture that may be implemented to use an image look ahead concept to save consumable power in accordance to an embodiment.

FIG. 4 is an illustration of the image path architecture 400 that may be implemented to use an image look ahead concept to save consumable power in accordance to an embodiment. The imager video data module 410 receives the print job consisting of a plurality of images. The print job is separated into component images each representing a page of a document to be reproduced. The component images are then individually fed to the videodatabuffer N-Lines for head delay Yreg and laser power null data control (videodatabuffer) 420 where the image gets processed for each imaging module to look-ahead to determine potential laser usage for a given laser. Each imaging module has an assigned look ahead buffer 490 for storing a one pixel by N pixel sub-image. Where "N" is based on the width of the imager model. The look-ahead buffer 490 has a top scanline data 494 and a bottom scanline data 496. The difference between the top and bottom of the buffer is indicative of the size of the buffer or the depth of the buffer 492. As general rule the size of the look-ahead buffer is a function of the settling time of the laser ($'\Omega$), process speed ($\omega$) which is proportional to the rotational speed of the imaging member, and safety factor ($\mu$). For a one meter per second (1 m/s) process speed, and a 2.5 msec settling time, and 100% safety buffer, a 5 mm buffer size is required. This is approximately equivalent to 120 pixels at a 600 dpi resolution. In an embodiment, the look-ahead buffer size is determined by the following equation: $B=\mu \times '\Omega \times \omega \times dpi \times 1000/25.4$. The look-ahead buffer could be at the contone part of the image path or at the halftone part of the image path. It is noted that a separate look-ahead buffer is required for each image module.

The controller 140 looks at the content in the look-ahead buffer 490 to determine if there are pixels to be illuminated by the laser 132. Every controller 140 has a null video data block detection module 430. The function of the module is to determine if there are any "ON" pixels for the horizontal scanline data for that imaging module. If at the start of the printing cycle the laser is "ON" and the look-ahead buffer has only "OFF" pixels the laser would be deenergized. However, if there are any "ON" pixels the laser is energized, i.e., kept on. The laser power on/off module 440 receives a determination from the null video data block detection module 430 to supply electrical power to the laser 132. The laser illumination module 450 powers the laser based on the received signal from the laser power on/off module 440 and introduces it into the laser 132 so as to project the image laser light 480 on the imaging member 12. The DLP also receives a signal from the image video active line data module 460 which indicates which mirrors are to be in a state for the laser light impinging on the mirrors to be projected onto the imaging member 12 and which mirrors are to be in a state for the laser light impinging on the mirrors will be scrapped using the chilled light dump heat sink 135.

Figure 5:
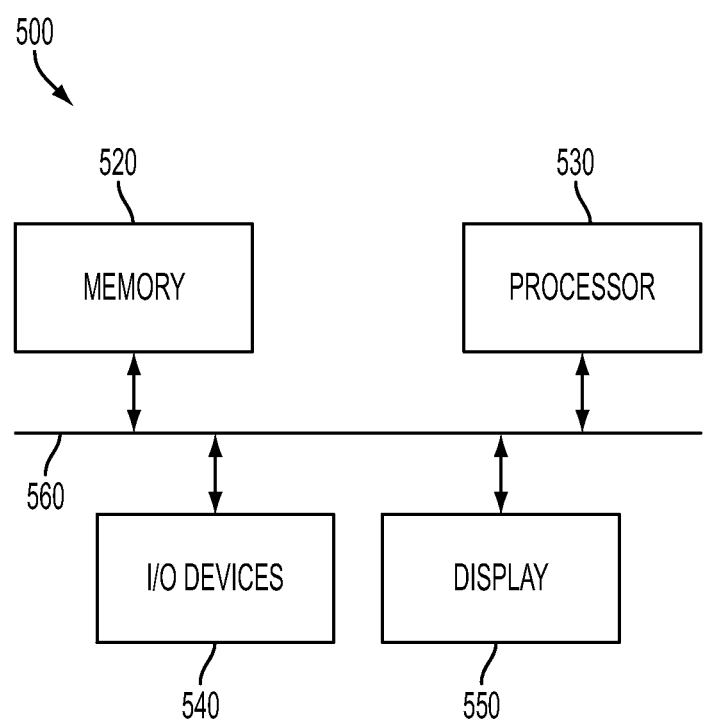
FIG. 5 illustrates a block diagram of a controller to selectively power the energizable laser source based on the scanline of image data in the look ahead buffer in accordance to an embodiment.

FIG. 5 illustrates a block diagram of a controller 500 to selectively power the energizable laser source based on the scanline of image data in the look-ahead buffer in accordance to an embodiment.

The controller 500 may be embodied within devices such as a desktop computer, a laptop computer, a handheld computer, an embedded processor, a handheld communication device, or another type of computing device, or the like. The controller 500 may include a memory 520, a processor 530, input/output devices 540, a display 550 and a bus 560. The bus 560 may permit communication and transfer of signals among the components of the computing device 500.

Processor 530 may include at least one conventional processor or microprocessor that interprets and executes instructions. The processor 530 may be a general purpose processor or a special purpose integrated circuit, such as an ASIC, and may include more than one processor section. Additionally, the controller 500 may include a plurality of processors 530.

Memory 520 may be a random access memory (RAM) or another type of dynamic storage device that stores information and instructions for execution by processor 530. Memory 520 may also include a read-only memory (ROM) which may include a conventional ROM device or another type of static storage device that stores static information and instructions for processor 530. The memory 520 may be any memory device that stores data for use by controller 500.

Input/output devices 540 (I/O devices) may include one or more conventional input mechanisms that permit a user to input information to the controller 500, such as a microphone, touchpad, keypad, keyboard, mouse, pen, stylus, voice recognition device, buttons, and the like, and output mechanisms such as one or more conventional mechanisms that output information to the user, including a display, one or more speakers, a storage medium, such as a memory, magnetic or optical disk, disk drive, a printer device, and the like, and/or interfaces for the above. The display 550 may typically be an LCD or CRT display as used on many conventional computing devices, or any other type of display device.

The controller 500 may perform functions in response to processor 530 by executing sequences of instructions or instruction sets contained in a computer-readable medium, such as, for example, memory 520. Such instructions may be read into memory 520 from another computer-readable medium, such as a storage device, or from a separate device via a communication interface, or may be downloaded from an external source such as the Internet. The controller 500 may be a stand-alone controller, such as a personal computer, or may be connected to a network such as an intranet, the Internet, and the like. Other elements may be included with the controller 500 as needed.

The memory 520 may store instructions that may be executed by the processor to perform various functions. For example, the memory may store instructions to selectively power the energizable laser source based on the sub-image in the look ahead buffer, instructions for controlling a laser beam in relation to the angular position of the drum such that laser beam occur whenever the target area on the drum surface has moved a distance in the direction of rotation, instruction to regulate laser power, instructions in determining the size of the look-ahead buffer, and other instructions that are well known to those in the art.

Figure 6:
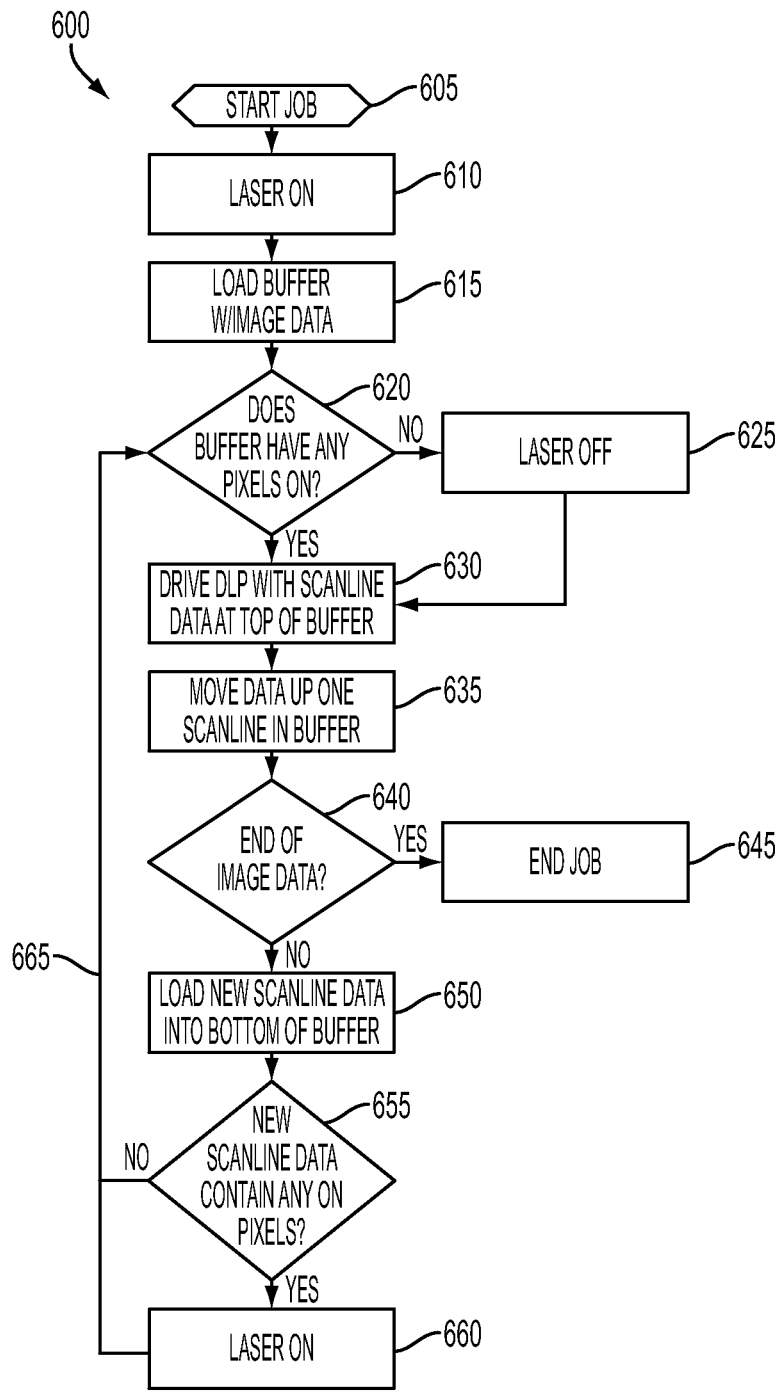
FIG. 6 is a flowchart of a method that may be implemented in an imager module for laser power control in accordance to an embodiment.

FIG. 6 is a flowchart of a method 600 that may be implemented in an imager module for laser power control in accordance to an embodiment.

Method 600 is a process implemented on each imaging module so that the module can achieve power conservation by selectively turning the laser "ON and OFF". It is, however, within the skill of those in the art to implement this process in a single processor for all the imaging modules through such well know techniques as buffer allocation and synchronized instruction routing in multiprocessor environments.

Action 605, Start Job, begins method 600. The print job starts in a normal fashion. The machine cycles up and each imaging module is prepared to receive imaging data. Control is then passed to action 610 where the laser 132 is put in the "ON" state. It should be noted that the laser could initially be in the "OFF" state provided there is a delay before imaging that is at least equal to the cycle time of the laser. It is assumed that when the method is started there will be imaging data available to be processed immediately. It is foreseeable, however, that delays such as calibration of the electronics could influence that decision. In action 610, the laser 132 is placed in the ON state in preparation for imaging.

In action 615, the look-ahead buffer is filled with image data. The initial image data is tiled into a sub-image of vertical scan data that is assigned to a corresponding imaging module. For example, in a lithography system having thirty six (36) imaging module the original image is chopped into thirty six distinct strips that are assigned to the imaging modules equally. The look-ahead buffer is then filled with image data for this module. The imaging module will store the strip in a suitable storage device such as a RAM for quick access. The received strip is then streamed or continuously fed into the look-ahead buffer until the strip is completely projected on the imaging member. Since all the imaging modules are acting in concert the image is projected on the member where the scan line is across the member (horizontal) and the rotation of the member provides the other scan line axis (vertical).

In action 620, the look-ahead buffer is analyzed to determine if the buffer has any pixels "ON". If is determined that the buffer does not have any "ON" pixels, the Laser is turned "OFF" in action 625. Regardless of whether the look-ahead buffer has any pixels "ON" or "OFF" control is passed to action 630. In action 630, the DLP uses the scanline data at the top of the buffer. As noted above if the top entry in the buffer indicates any "OFF" pixels, but the column data indicates an "ON" laser condition, the laser energy is reflected by the DLP into the dump 135 since the laser has to be kept "ON" to illuminate that pixel when it reaches the top of the Queue. In action 630, a signal is used to drive DLP mirrors with one scan line at the top of the buffer. The scanline data at the top of the buffer is used to drive the DLP mirrors to image one scanline. Light is directed onto the imaging plate for one scanline to evaporate fountain solution and create the 'latent image' for one scanline.

In action 635, the method moves the data up one scan line in the buffer. In action 635, the buffer is "POP"-ed which is the removal of the "oldest" element in the queue (top scanline). The "POP" function causes the entries to move up one row leaving, at a minimum, an open row that can be filled with data. In action 640, the look-ahead buffer is inspected to determine if a "NULL" condition exists, i.e. the method determines if the buffer is empty. If the buffer is found to be empty the method is terminated in action 645. If the buffer is not empty control is passed to action 650 for further processing.

In action 650, the method loads new scan line data into the bottom of the buffer. In action 650, the top entry of the remaining image data is "PUSH"-ed into the look-ahead buffer. The "PUSH" function adds a new element at the end of the queue, after its current last element, i.e., the uppermost element of the remaining image data is appended to the scan line data in the buffer. Control is then passed to action 655 for further processing. In action 655, If the new scan line data contains any "ON" pixels, then move to action 660 to turn Laser "ON" and return to action 620 for further processing. However, if the scan line data does not contain any "ON" pixels control is passed to action 620 for further processing.

In the preceding paragraphs, example embodiments of the invention were described. These embodiments are presented for purposes of illustration rather than of limitation, and minor changes may be made to the example embodiments without departing from the inventive principle or principles found therein. It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the followings claims.

What is claimed is:

1. A printing system to project an image on a reimageable surface layer on a rotating imaging member, the system having at least one imaging module each placed at individual zones adjacent to each other across from the imaging member to form a scanline of the image, each imaging module comprising:
   an energizable laser source for generating a laser beam when energized;
   a look ahead buffer for storing scanline data of the image to be projected on the imaging member, wherein the look ahead buffer has top scanline data and bottom scanline data;
   an optical assembly positioned to direct the laser beam at the individual zones to project the top scanline data in the look ahead buffer on the imaging member; and
   a logic circuit to selectively power the energizable laser source based on the scanline data in the look ahead buffer by:
      determining if the scanline data in the look ahead buffer has at least one pixel to be illuminated by the laser beam;
      if the scanline data in the look ahead buffer has at least one pixel to be illuminated then energizing the laser source so that the optical assembly can project the top scanline data on the imaging member;
      else deenergizing the laser source by interrupting electrical power to the laser source.

2. The printing system according to claim 1, the logic circuit further performing:
   removing the top scanline data in the look ahead buffer.

3. The printing system according to claim 2, the logic circuit further performing:
   moving remaining scan line data up one scanline in the look ahead buffer.

4. The printing system according to claim 3, the logic circuit further performing:
   appending additional scanline data of the image to the look ahead buffer;
   repeating the steps of determining, deciding, removing, moving, and appending until the look ahead buffer is empty.

5. The printing system according to claim 4, wherein the optical assembly includes a digital light projector multi-mirror array.

6. The printing system according to claim 5, wherein the reimageable surface layer on the rotating imaging member comprises silicone.

7. The printing system according to claim 4, wherein the size of the look ahead buffer is based on the rotational speed of the imaging member, laser source settling time, and a quality safety factor.

8. A power conservation method for at least one imaging module in a digital printing system with a reimageable surface layer on a rotating imaging member, each imaging module placed at individual zones adjacent to each other across from the imaging member to form a scanline of an image, the method comprising:
   generating a laser beam from an energizable laser source when energized;
   storing in a look ahead buffer scanline data of the image to be projected on the imaging member, wherein the look ahead buffer has top scanline data and bottom scanline data;
   directing with an optical assembly the laser beam at the individual zones to project the top scanline data in the look ahead buffer on the imaging member; and
   selectively powering the energizable laser source based on the scanline of image data in the look-ahead buffer by a logic unit performing the steps of:
      determining if the scanline data in the look ahead buffer has at least one pixel to be illuminated by the laser beam;
      if the scanline data in the look ahead buffer has at least one pixel to be illuminated then energizing the laser source so that the optical assembly can project the top scanline data on the imaging member;
      else deenergizing the laser source by interrupting electrical power to the laser source.

9. The method according to claim 8, the logic circuit further performing the steps of:
   removing the top scanline of the scanline of image data in the at least one look ahead buffer.

10. The method according to claim 9, the logic circuit further performing the steps of:
    moving remaining scanline of image data up one scanline in the at least one look ahead buffer.

11. The method according to claim 10, the logic circuit further performing the steps of:
    appending scanline of image data of an image to the at least one look ahead buffer;
    repeating the steps of determining, deciding, removing, moving, and appending until the optical assembly has projected the image on the substrate.

12. The method according to claim 11, wherein the optical assembly includes a digital light projector multi-mirror array.

13. The method according to claim 12, wherein the reimageable surface layer on the rotating imaging member comprises silicone.

14. The method according to claim 12, wherein the size of a look ahead buffer is based on the rotational speed of the imaging member, laser source settling time, and a quality safety factor.

15. A printing apparatus with at least one imaging module each placed at individual zones adjacent to each other to form a scanline of an image on a moving surface, the printing apparatus comprising:
    at least one energizable laser source for generating a laser line beam when energized;
    at least one look ahead buffer for storing scanline image data of an image to be ablated on the moving surface;
    at least one optical projection system positioned to direct the laser line beam for projecting a scanline of image data onto a target area of the moving surface;
    a control system for controlling the at least one energizable laser source whenever the target area on the moving surface has moved a distance in a process direction by performing the steps of:
    determining if a scanline of the scanline image data in the at least one look ahead buffer to be projected on the moving surface has at least one pixel to be ablated by the at least one energizable laser source;
       if the scanline of the scanline image data has at least one pixel to be ablated on the target area of the moving surface then energizing the at least one energizable laser source;
       else deenergizing the at least one energizable laser source by interrupting the electrical power.

16. The printing apparatus according to claim 15, wherein the determining is based on the scanline image data in the at least one look ahead buffer.

17. The printing apparatus according to claim 16, the control system further performing the steps of:

removing the top scanline of the scanline image data in the at least one look ahead buffer;

moving remaining scanline image data up one scanline in the at least one look ahead buffer.

18. The printing apparatus according to claim 16, the logic circuit further performing the steps of:

appending scanline image data of an image to the at least one look ahead buffer;

repeating the steps of determining, deciding, removing, moving, and appending until the optical assembly has projected the image on the moving surface.

19. The printing apparatus according to claim 18, wherein the optical assembly includes a digital light projector multi-mirror array.

20. The printing apparatus according to claim 19, wherein the moving surface can be of different configurations, comprising a plate, a cylindrical drum, a scroll, or an endless flexible belt.

21. The printing apparatus according to claim 19, wherein the moving surface is treated with a dampening solution.

22. The printing apparatus according to claim 21, wherein the optical projection system deflects individual mirrors to form pixels on a silicone surface on the moving surface, and wherein the size of a look ahead buffer is based on the speed of the moving surface, laser source settling time, and a quality safety factor.

\* \* \* \* \*